(No Model.)

F. W. QUITMAN.
SOLDERING OR BRAZING TORCH.

No. 433,631. Patented Aug. 5, 1890.

WITNESSES:
Alfred Beattie Jr.
Chas. A. Hildenbrand

INVENTOR
Frederick W. Quitman
BY Stephen J. Cox
ATTORNEY

UNITED STATES PATENT OFFICE.

FREDERICK WILLIAM QUITMAN, OF SOUTH NORWALK, CONNECTICUT.

SOLDERING OR BRAZING TORCH.

SPECIFICATION forming part of Letters Patent No. 433,631, dated August 5, 1890.

Application filed November 7, 1889. Serial No. 329,526. (No model.)

*To all whom it may concern:*

Be it known that I, FREDERICK WILLIAM QUITMAN, of South Norwalk, Connecticut, have invented a certain Improvement in Soldering or Brazing Torches, of which the following is a full and true description, enabling others skilled in the art to which it pertains to make the same.

My invention relates to a soldering or brazing torch; and its object is to enable the person using the flame to concentrate the desired heat upon any fixed point of weld without moving the object to be welded. It may also, with slight variations, be used as an attachment to a gas-pipe for the purpose of illumination. These purposes I effect by means of the device shown in the following drawings, in which like letters refer to like parts in each.

Figure 1:
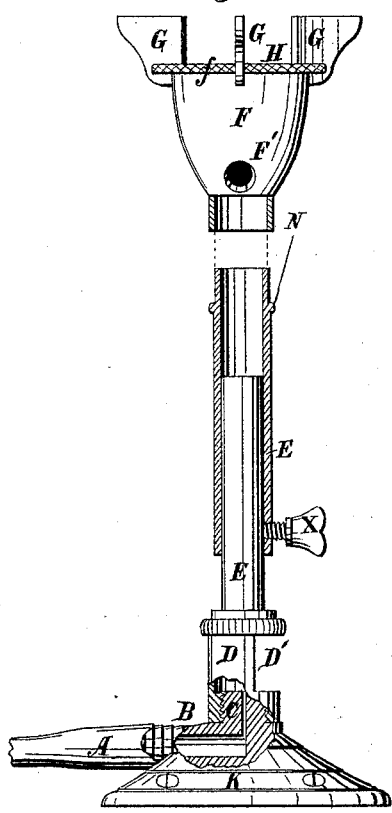
Figure 2:
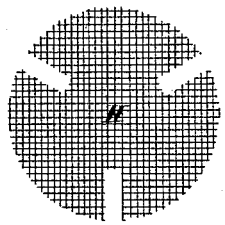

Figure 1 is a perspective sectional view of the device. Fig. 2 is a plan view of the mesh-cover.

In Fig. 1, A is the rubber gas-supply pipe, B is the metal supply-pipe, C is the supply-port to the chamber D, which is cut away at D', and E is the tube which telescopes into the tube E'. Upon the upper end of E is a shoulder N, upon which the cone-shaped burner F loosely fits. F' is an air-hole in this cone, and G G are lugs for supporting any article far enough from the flame to allow complete combustion. The surface of this cone F through which the flame P passes is covered with a wire mesh H, which is bent over the edge of the flange *f*, from which position it can easily be removed and replaced.

Fig. 2 shows the shape of wire mesh. The set-screw X is for the purpose of holding the outer tube E' in place when so desired. The cut-away portion D' of the chamber D is for the purpose of admitting air to the chamber D, and the hole F' in the cone-top is for a similar purpose as regards the cone. These openings may be dispensed with partially or altogether when the device is used only for illumination.

The lower portion of the lamp may be regarded as a Bunsen burner, adapted to the purpose for which I intend it. The cone F may be readily detached and a flame of great length induced by extending the tube E. This long flame is of great use in soldering on the inside of many articles.

Heretofore, so far as I am aware, soldering or blow-pipe flames have been fixed, and the object to be welded has been placed upon a piece of charcoal or wire mat or other device and moved about by hand in order to receive the proper heat-flame at the right point. This in large articles is very inconvenient, and when a long weld or braze is to be made compels the operator to reverse and then turn the same, thus consuming time and allowing the soldering-surface to cool, to the detriment of the operation. With my device an extended surface may be operated upon by an equal intensity of flame without altering the position of the article to be soldered or welded.

As this lamp is especially adapted for jewelers and silversmiths, who generally use the silent-pointed or deoxidizing flame, it will be seen that a great advantage is gained by telescoping the tubes E E', so that a uniform heat and flame can be induced along the whole line of a given weld in blow-pipe welding. Again, where the flame is used without the blow-pipe, as in coloring, the great heat, large surface, and smokeless flame produced in forcing the gas through the mesh H is a great advantage, while the lugs G G support the article to be acted upon by the flame. The set-screw X is simply to regulate the telescoping tubes; but generally it is little used, as the hand grasps the upper tube and moves it about at will. The amount of flame used is regulated by the amount of gas turned on through the connecting-pipe A.

Having thus described my invention, what I claim as new, and desire to secure by Letters Patent, is—

A portable soldering or brazing torch consisting of a gas-burner over which a tube telescopes, with a set-screw to regulate its position, said tube having a flange N, adapted to support a removable burner, as herein described and set forth.

FREDERICK WILLIAM QUITMAN.

Witnesses:
C. R. TOWNSEND,
JOSEPH TAYLOR.